United States Patent [19]

Chang et al.

[11] Patent Number: 5,135,992
[45] Date of Patent: Aug. 4, 1992

[54] AMIDE-AMINE SILANE RESIN

[75] Inventors: Wen-Hsuan Chang, Gibsonia; Edward E. McEntire, Allison Park; J. Alden Erikson, Gibsonia, all of Pa.

[73] Assignee: PPG Industries, Inc., Pittsburgh, Pa.

[21] Appl. No.: 466,890

[22] Filed: Jan. 18, 1990

[51] Int. Cl.$^5$ .............................................. C08F 20/00
[52] U.S. Cl. ................................... 525/446; 525/487; 528/26; 528/28; 528/27; 528/29; 528/38
[58] Field of Search .................. 528/26, 28, 38, 27, 528/29; 525/446, 487

[56] References Cited

U.S. PATENT DOCUMENTS

| | | | |
|---|---|---|---|
| 2,885,419 | 5/1959 | Beinfest et al. | 260/448.8 |
| 3,426,057 | 2/1969 | Kanner | 260/448.2 |
| 3,895,043 | 7/1975 | Wagner et al. | 260/448.8 R |
| 4,031,120 | 6/1977 | Gervase | 260/448.8 R |
| 4,093,673 | 6/1978 | Chang et al. | 260/824 EP |
| 4,243,767 | 1/1981 | Kaufman et al. | 525/102 |
| 4,465,712 | 8/1984 | McVie | 525/446 |
| 4,472,465 | 9/1984 | Burrill | 525/446 |
| 4,678,835 | 7/1987 | Chang et al. | 525/100 |
| 4,871,788 | 10/1989 | Plueddemann | 525/446 |
| 4,988,778 | 1/1991 | Chang et al. | 525/476 |
| 4,999,413 | 3/1991 | Panster et al. | 528/38 |

Primary Examiner—Melvyn I. Marquis
Attorney, Agent, or Firm—Linda Pingitore; Godfried R. Akorli; Daniel J. Long

[57] ABSTRACT

Disclosed herein are amido-amine silane resins prepared by reacting an aminosilane with a hydroxy alkyl functional amine and a polyisocyanate or a polyacid or its lower alkyl ester.

5 Claims, No Drawings

AMIDE-AMINE SILANE RESIN

BACKGROUND OF THE INVENTION

Field of the Invention: The present invention relates to a curable silane resinous composition containing an amide and an amine moiety.

BRIEF DESCRIPTION OF THE PRIOR ART

Incorporation of an amide moiety, in particular, a polyamide moiety, into a liquid resinous composition is generally difficult, especially when it is desired to maintain a relatively high fluidity or solubility of the resinous composition. The associated difficulty resides in the relatively high viscosity and insolubility of the polyamide. Consequently, many of the art-known polyamides, e.g., nylon polyamides, are melt processed at undesirably high temperatures.

Also incorporation of a functional group, in particular, a polyfunctional amino group, into a resin is difficult, particularly in the instance of two or more amino groups. The associated difficulty may be manifested by unwanted molecular weight increase and, consequently, viscosity increase of the resin due to unwanted side reactions such as branching or crosslinking. (Illustratively, the reaction of a diamine with a diepoxide may result in a high viscosity product). An alternate approach of employing an amine compound containing another reactive group such as a hydroxyl group presents its problems. Since the amine, in many reactions, is more reactive than other functional groups, it is consumed in preference to the other functional groups. Thus, the desired amine-functional group is typically lost via reactions with esters, acids, isocyanates, epoxies and the like.

As would be realized, a facile incorporation of an amide and an amine moiety into a resinous composition and, in this case, a resinous silane composition will desirably harness the properties of the amide, amine, and silane moieties. In relevant particulars, a silane resin is generally advantaged by low viscosity and, consequently, low volatile organic content (VOC), durability, and flexibility. A polyamide resin is generally advantaged by good mechanical properties, such as hardness, toughness, pliability or elasticity; and chemical properties, such as solvent resistance. The polyamines can provide a means for crosslinking the resin with another crosslinkable material, such as an epoxy resin.

SUMMARY OF THE INVENTION

In accordance with the foregoing, the present invention encompasses a stable polyamine-functional alkoxysilane resin containing an amido group of the structure

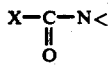

wherein X is a carbon, nitrogen or oxygen atom (alternately referred to herein as an amido-amine silane resin). The amido-amine silane resin of this invention is characterized as a high solids resin. It can be formulated into a coating composition of a low volatile organic content (VOC) which can cure (with or without a catalyst) at a low or an ambient temperature, or at an elevated temperature to produce a film which can be hard, flexible, durable, and which can have a good gloss. The curable composition and an article of matter prepared therewith are also encompassed by this invention.

DETAILED DESCRIPTION OF THE INVENTION

The amido-amine silane resin of the invention can be prepared by reacting (i) a polycarboxylic acid, a polyisocyanate, an aryl or a low alkyl ester of a polycarboxylic acid, an aryl or a low alkyl ester of a polycarbamic acid or an aryl or a low alkyl ester of a polycarbonic acid; (ii) a hydroxy- and amine-functional compound; and (iii) an aminoalkoxysilane compound. The low alkyl ester of the polyacid (including polycarboxylic acid, polycarbonic acid and polycarbamic acid) contains in the alkyl group from about 1 to 3 carbon atoms. Preferably, the alkyl group is a methyl group. The useful polyacid or ester thereof may contain a substituent or a moiety in its polymer backbone provided that the substituent or moiety does not adversely affect the preparation or use of the amido-amine silane resin. The substituent or moiety can be in the form of an amide (which is different from the amido group defined above), ester, ether, urea, urethane or a combination thereof preferably in the resin backbone. The number average molecular weight of the polyisocyanate or the polyacid or the ester thereof can be from about 90 to 10,000 and preferably from about 90 to 4500, and more preferably from about 90 to 2800.

An illustrative but non-limiting example of the useful polycarboxylic acid or the ester thereof is preferably a dimer acid, such as EMPOL 1010 (available from Emery Industries) or a carbomethoxy-terminated polyester such as the reaction product of trimethylolpropane and dimethyl cyclohexanedicarboxylate. Other examples of the useful polyacid or the ester can be oxalic acid, adipic acid, sebacic acid, dimethyl adipate, dimethyl azelate, dimethyl dodecanedioic acid ester, dimethyl cyclohexanedicarboxylate; a lower alkyl ester of a polyamido polyacid such as the reaction product of dimethyl cyclohexanedicarboxylate and JEFFAMINE T-403 (a polyoxypropylene polyamine available from Texaco Co.) or the like. Also the likes of trimer acids may be employed. In general, the esters are preferred.

An illustrative but non-limiting example of the ester of polycarbamic acid can be a reaction product of an alcohol, e.g., methanol or ethanol with a polyisocyanate, e.g., hexamethylene diisocyanate. An illustrative but non-limiting example of the ester of polycarbonic acid can be a reaction product of an alcohol such as methanol or ethanol and a polychloroformate such as hexamethylene bis(chloroformate). The polyisocyanate can be hexamethylene diisocyanate, toluene diisocyanate, isophorone diisocyanate or the like.

The hydroxy- and amine-functional compound useful herein can be an amino alcohol, a polyamino alcohol, a polyamino polyalcohol, or an amino polyalcohol which is preferred. Non-limiting examples of the hydroxy- and amine-functional compound can be diisopropanolamine, diethanolamine, diisobutanolamine, ethanolamine, isopropanolamine, N-aminoethyl-ethanolamine or N-aminopropyl-diethanolamine. The useful hydroxy- and amine-functional compound may contain an amide (which is different from the amido group defined above), a urethane or urea substituent or moiety in the chain of the compound with the proviso that the substituent or moiety does not adversely affect the preparation or use of the amido-amine silane resin.

Yet, other hydroxy- and amine-functional compounds useful herein can be prepared by appropriately modifying a hydroxy- and amine-functional compound or a precursor thereof as illustrated hereinafter. An amine-functional compound or a hydroxy- and amine-functional compound can be reacted with an epoxy compound such as a diepoxide, e.g., DRH 151 (a saturated epoxide from Shell Chemical Co., also known as EPONEX 1510) or a monoepoxide such as CARDURA E (a glycidyl ester of a 9,10-unsaturated Versatic acid from Shell Chemical Co.); a polyamino alcohol or a polyamine can be reacted with a carbonate, e.g., propylene carbonate; a lactone such as a caprolactone, or a butyrolactone; a polyamino alcohol can be reacted with an isocyanate, e.g., trimethylhexamethylene diisocyanate. Specifically, isopropylamine and CARDURA E can be reacted at 1:1 mole ratio; butylamine and phenyl glycidyl ether can be reacted in a mole ratio of 1:1; isophorone diamine and caprolactone can be reacted in a mole ratio of 1:1; a diisopropanolamine and hexamethylene diisocyanate can be reacted in greater than 2:1 mole ratio to produce the useful hydroxy- and amine-functional compound.

The aminoalkoxysilane useful herein is of the formula:

$$RNHR^1Si(R^2)_m(OR^3)_n$$

wherein R is hydrogen, a hydrocarbon radical which can be substituted or unsubstituted, such as an alkyl group with no more than 4 carbon atoms, an aminoalkyl group, alkylaminoalkyl group, or alkoxysilano alkyl group with no more than 6 carbon atoms in the alkyl group; $R^1$ is an alkylene having 2 to 6 carbon atoms; cycloalkylene or aryl group; $R^2$ is an alkyl having 1 to 10 carbon atoms, cycloalkyl or aryl group; $R^3$ is a lower alkyl group of about 1 to 4 carbon atoms; and m is 0 or 1; n is 3 to 2, and m+n=3. The definition of $R^1$, $R^2$, and $R^3$, as described hereinabove, can broadly encompass other hydrocarbon or substituted hydrocarbon radicals provided that the nature thereof does not affect the preparation or use of the claimed invention. An illustrative but non-limiting example of the aminoalkoxy silane can be aminopropyltrimethoxysilane, aminopropyltriethoxysilane, aminopropylmethyldimethoxysilane, aminopropylmethyldiethoxysilane, aminoethyl-gamma-aminopropyl-trimethoxysilane, or iminobis(propyl-trimethoxysilane).

In preparing the amido-amine silane resin of this invention, typically the aminoalkoxysilane, the hydroxy- and amine-functional compound and the polyisocyanate or the useful polyacid or the ester thereof can be reacted as follows. The reactants can be mixed at room temperature in a properly equipped reaction vessel and heated over a range of temperature and for a period of time sufficient to effect reaction. The temperature range is usually from about 25° C. to 250° C. over 2 to 3 hours and typically about 120° C. to 170° C. over 2 to 3 hours.

The reaction may be optionally staged depending on the product derived. For example, the aminosilane and the polyacid or ester thereof may be combined and heated to produce the amido group of the amido-amine silane, then the hydroxy- and amine-functional compound may be added to produce the product which further contains the amine moiety (left from the hydroxy- and amine-functional compound). Conversely, the hydroxy- and amine-functional compound and the acid (or lower alkyl ester thereof) may be combined and heated to produce the amido group. The aminosilane may then be added and heated to produce the product which further contains the amine moiety of the aminosilane. Further, the hydroxy- and amine-functional compound may be reacted with the aminosilane to produce a polyamine compound which may be further reacted with the polyacid (or ester thereof) or polyisocyanate to produce the product containing the amido group. In addition, all three reactants may be mixed and heated together to form a product where the amine moiety is derived from both the hydroxy- and amine-functional compound and the aminosilane. A solvent and a catalyst may be used for ease of reaction. The useful solvent can be xylene, toluene or the like. The useful catalyst can be dibutyltin dilaurate or other tin catalyst or bases.

The reactants can be employed in such ratios that the resultant product is non-gelled and that the equivalents of ester (or isocyanate or acid) groups are typically less than the total of equivalents of the amine relative to the amine-containing reactant, such that the ester (or isocyanate or acid) is essentially consumed by the amine containing reactants to form the desired amido group. The equivalents of alkoxysilane added is typically equal to or in excess of the equivalents of hydroxyl in the reactant, such that the hydroxyl is essentially consumed by reaction with the silane moiety.

More specifically, the ratio of the reactants can be as follows. The equivalent ratio of the aminoalkoxysilane (based on the amine) to the polyisocyanate (based on NCO) or to the useful polyacid or the ester thereof can be from about 1:1.5 to 4:1 and preferably from about 1:1 to 3:1. The equivalent ratio of the aminoalkoxysilane (based on alkoxysilane) to the hydroxy- functional amine compound (based on the hydroxy content) can be from about 1:0.2 to 1:4 and preferably about 1:0.3 to 1:1. The equivalent ratio of the hydroxy functional amine compound (based on amine content) to polyisocyanate or the useful polyacid or the ester thereof can be from about 0.5:1 to 4:1 and preferably from about 1:1 to 3:1.

The reaction product comprising the amido-amine silane is ungelled and a liquid which is usually clear in appearance. By ungelled is meant that the reaction product will flow and will dissolve in a solvent such as methanol. Preferably, the reaction product is of a high solids of about 60 to 100 percent and preferably about 70 to 100 percent based on total resin solids content. Solids content can be measured at 110° C. for 30 minutes by ASTM Method No. 2369. The viscosity can range from about 50 to 5000 and preferably from about 500 to 4000 centipoises, measured at 25° C. with a Brookfield viscometer. The weight average molecular weight of the polyamido-amine silane resin can be from about 450 to 10,000 and preferably from about 500 to 5000 based on the polystyrene standard as measured by gel permeation chromatography. The equivalent weight of the amido group is preferably less than 1000 and more preferably less than 500. The equivalent weight of the amine can be less than 1000 and preferably less than 500. The equivalent weight of the silane can be less than 1000 and preferably less than 500. The reaction product is stable in that it is storage stable for a period of at least one month at ambient temperatures in the absence of moisture.

A curable composition of the amido-amine silane resin can be prepared by combining it with a curable material. Illustrative but non-limiting examples of the curable material can be an epoxy material, e.g., a polyepoxide such as a polyglycidyl ether, e.g., EPON 1001

(available from Shell Chemical Co.); a saturated epoxy resin such as EPONEX 1510 (from Shell Chemical Co.); an epoxy-functional acrylic resin; a polyisocyanate (including a blocked isocyanate) such as tetramethylxylylene diisocyanate, toluene diisocyanate, isophorone diisocyanate, hexamethylene diisocyanate; an acrylic-functional polymer, such as pentaerythritol triacrylate or the like.

The curable composition may be utilized with or without a catalyst. The amido-amine silane can be employed in an amount of about 5 to 90 percent and preferably from about 10 to 80 percent by weight based on the total resin solids. The curable composition is employed as a coating for various substrates such as metal, paper, wood, hardboard, plastic or the like. The curable composition may be pigmented or unpigmented. An additive such as a flow control agent, surfactant, leveling agent, anti-mar agent, fungicide, mildewcide, desiccant or a mixture thereof can be employed herein. An example of the pigment may be any generally known pigment including an extender pigment used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, an organic pigment of the azo series, etc. A mixture of pigments also may be employed.

The curable composition can be prepared by blending the amido-amine silane resin with curable material and other coating additives. A solvent and a catalyst can be employed in the coating composition. The useful solvent can be xylene, toluene, methanol, ethanol or butyl cellosolve. The catalyst can be dibutyltin diacetate, stannous octoate, tetrabutyl titanate, or calcium nitrate. The catalyst may be present in an amount of about 0.1 to 5 percent by weight based on the weight of the total resin solids.

The curable composition of this invention can be of low volatile organic content (VOC). Generally, the VOC of the curable composition can be about 0.1 to 6 pounds per gallon and preferably about 0.2 to 4 pounds per gallon. VOC is defined as weight per volume of any organic compound that evaporates from the curable composition. VOC can be determined by ASTM D3690 testing.

The curable composition may be applied to substrates using any suitable technique such as brushing, spraying, roll coating, doctor blade coating, etc. The curable composition utilizing the amido-amine silane resin typically may be cured at room temperature over a period of, say, about 5 hours to 3 days. Alternately, the composition can be cured at an elevated temperature of, say, about 80° F. to 350° F. and preferably about 120° F. to 250° F. over a period of about 5 to 60 minutes and preferably about 10 to 30 minutes. Films of the cured composition can be hard and flexible. By the term "hard" is meant that the cured films of dry film thickness of about 1 mil on BONDERITE® pretreated steel substrate (available from Parker Co.) would have a pencil hardness of about B to 6 H. By the term "flexible" is meant that the cured composition at a dry film thickness of about 1 mil on BONDERITE® 1000 steel substrate (available from Parker Co.) can withstand a 20 inch-pound ball drop.

The amido-amine silane resin of the invention also may be utilized as an additive to modify the property of a generally known coating composition. For example, the reaction product may be incorporated in additive amounts to modify a property such as rheology, by way of viscosity, surface tension, flow, leveling, etc. An "additive amount" is understood herein to mean an amount of up to about 50 percent by weight based on the weight of resin solids in the coating composition (i.e., excluding pigments and solid fillers). The reaction product of the invention also may be utilized either as a major or minor ingredient of a sealant composition and an adhesive composition.

The following examples illustrate the invention and are not to be construed as limiting it to their details. All parts and percentages in the examples and throughout the specification are by weight unless specifically indicated otherwise.

EXAMPLE 1

To a 1-liter four-necked glass round bottomed flask equipped with a stirrer, nitrogen atmosphere, thermometer, Dean Stark trap and condensor were charged 375 grams (g) of trimethanolpropane (TMP)-dimethyl cyclohexanedicarboxylate (DMCD) polyester* (1:3 mole ratio), 147 g of 2-amino-2-methyl-1-propanol and 325 g of gamma-aminopropyrtriethoxysilane.

* The typical method of making polyester with methyl carboxylate termination is as follows:

| Ingredients | Parts by Weight (grams) |
|---|---|
| Trimethylolpropane | 1084 |
| Dimethyl cyclohexyldicarboxylate | 4851 |
| Dibutyltin dilaurate | 59 |
| Triphenyl phosphite | 5.9 |

In a 12-liter flask equipped with thermometer, stirrer, nitrogen, inlet tube, fraction column, the above mixture was charged and heated. The temperature rose slowly from 75° C. to 220° C. and the by-product methanol was removed by distillation. There was 920 ml distillate (725 g) removed. The product had viscosity of Z6+. The distillate was analyzed: 97 percent methanol and <1 percent dimethyl cyclohexane dicarboxylate.

The contents of the flask were heated to 200° C. for over four hours during which time 59.9 g of methanol was distilled. The yield was 709 g. The flask contents were cooled to near ambient temperatures and 177 g of methanol was added to produce a reaction product having a solids content of 80 percent, a viscosity of P (Gardner-Holt), amine equivalent weight of 387, color of 3-4 (Gardner), and a density of 8.85 pounds per gallon.

EXAMPLE 2

To a 5-liter four-necked glass round bottomed flask equipped with a stirrer, nitrogen atmosphere, thermometer, Dean Stark trap and condensor were charged 260 g of dimethyl sebacate (1 mole) and 300 g of propanolamine (4 moles) and heated to 160° C. for over five hours during which time 70.2 g of distillate was removed. One hundred grams (100 g) of the resultant product (0.819 equivalent of hydroxyl group) was mixed with 60 g (1 equivalent of methoxy group) of gamma-aminopropyl-triethoxysilane. The resulting mixture was heated for over two hours to 185° C. 23.9 g of distillate was collected. The product yield was 134 g with an amine equivalent weight of 180.

To 50 g of CARDURA E (glycidyl ester of a 9,10 Versatic acid from Shell Chemical Co.) was added 100.0 g of the above resinous product. The mixture was heated in a microwave oven for 40 seconds to obtain a homogeneous mixture. Fifteen grams of the mixture was stirred with 12 g of DRH 151, (an epoxy resin from Shell Chemical Co.), 2 g of xylene, and 4 g of butyl Cellosolve until homogeneous mixture was obtained. A drawdown of the mixture was immediately made with a (0.003 inch-Bird) drawbar on a steel panel treated with BONDERITE ® 1000 pretreatment from Parker Co. The panel was exposed to air for 20 minutes and then cured at 250° F. for 30 minutes to produce a film with high gloss. The film surface had 1 centimeter (cm) BENARD cells, mostly 4 and 5 sided. Direct and reverse impact were 160 inch-pounds. The pencil hardness was B.

EXAMPLE 3

To a 5-liter four-necked glass round bottomed flask equipped with a stirrer, nitrogen atmosphere, thermometer, Dean Stark trap and condensor were charged 1,232 g (2.2 moles) of EMPOL 1010 (a dimer fatty acid of 36 carbon atoms available from Emery Industries), 878 g (3.0 moles) of diisopropanolamine and 88 g of xylene.

The contents of the flask were heated to 180° C. over 2.5 hours during which time 79 milliliter (ml) of water was distilled. Then the reaction temperature was reduced to 99° C., and 1,459 g (3 moles) of gamma-aminopropyltriethoxysilane (available as A-1100 from Union Carbide Co.) was added. The reaction temperature was raised over 3.5 hours to 194° C., while 860 ml of distillate was collected. The flask contents were cooled to 95° C., then 360 g of toluene was added, followed by the addition of 360 g of ethanol. The product had a viscosity of 28.5 stokes (Z-Z1 Gardner), amine equivalent weight of 416, and a density of 8.07 pounds per gallon.

To 25 g of EPON ® 828 polymeric epoxide (Shell Chemical Co.) were added 32.0 g of the above product, 0.5 g of NUOSPERSE 657 (a wetting agent available from Huels America Corp.), and 26.4 g DOWANOL ® PM (a solvent available from Dow Chemical Co.). The mixture was stirred until it became homogeneous, then a drawdown was made with a No. 40 wire wound drawbar on a steel panel treated with BONDERITE ® 1000.

The resulting film was allowed to flash at room temperature for 5 minutes and then baked for 30 minutes at 150° F. The film, after cooling for 15 minutes, had a thickness of 1.2 mils, a B pencil hardness, and solvent resistance as demonstrated by the 45 double rubs of methyl ethyl ketone needed to remove the film. After standing at room temperature, overnight, solvent resistance increased (to 85 double rubs) and pencil hardness was F. Excellent adhesion to the panel was demonstrated by crosshatch adhesion retention after tape-off of 99 percent after seven days. Impact resistance was greater than 100-inch pounds forward impact. One-eighth inch conical mandrel bend test gave only 6 millimeters (mm) tape-off, after seven days.

EXAMPLES 4-14

A series of related resins were prepared from essentially the same reactants: dimer acid, diisopropanolamine, and aminosilanes, and by essentially the same procedure as described in Example 3. The results are shown in the following table.

TABLE 1

| Example | Dimer Acid (Moles) | DIPA (Moles) | A-1110 (Moles) | A-1100 | Analytical Solids | Viscosity (Gardner) | Solvent | Solvent | Solvent Ratio | Amine Equivalent Weight |
| --- | --- | --- | --- | --- | --- | --- | --- | --- | --- | --- |
| 4 | 1 | 2 | 2 | — | 81.6 | Z5 | — | — | — | 446 |
| 5 | 1 | 2.5 | 2.5 | — | 82.8 | Z1 | Xylene | Methanol | 50/50 | 386 |
| 6 | 1 | 3.5 | 3.5 | — | 82.4 | Y | Xylene | Methanol | 50/50 | 313 |
| 7 | 1 | 4 | 3.5 | — | 84.6 | Z1+ | Toluene | Methanol | 50/50 | 306 |
| 8 | 1 | 3 | 3 | — | 78.1 | Z1-Z2 | Toluene | Methanol | 82/18 | 376 |
| 9 | 1 | 4 | 4 | — | 70.0 | I— | Xylene | Methanol | 50/50 | 314 |
| 10 | 1 | 4 | — | 4 | 93.9 | Z7— | — | — | — | 276 |
| 11 | 1 | 3 | — | 3 | 76.9 | Z1-Z2 | Toluene | Ethanol | 50/50 | 408 |
| 12 | 1 | 3.5 | — | 3.5 | 77.1 | W+ | Xylene | Ethanol | 50/50 | 356 |
| 13 | 1 | 4 | 3.5 | — | 88.9 | Z5 | Toluene | Methanol | 50/50 | 305 |
| 14 | 1 | 4 | 3.5 | — | 88.4 | Z4-Z5 | Toluene | Methanol | 50/50 | 308 |

DIPA = diisopropanolamine.
A-1110 = aminopropyltrimethoxysilane from Union Carbide Corp.
A-1100 = aminopropyltriethoxysilane from Union Carbide Corp.

EXAMPLE 15

In a properly equipped reaction vessel, diisopropanolamine (133 g, 1 mole) was mixed with a 2:1 mole ratio trimethylhexamethylene diisocyanate-1,6 hexanediol isocyanate prepolymer (133 g, 0.23 mole). The reaction temperature rose to 90° C. The product had both amine, hydroxy, and amide groups. After cooling to 70° C., there was added A-1110 (179 grams, 1 mole). The reaction mixture was heated slowly to 156° C. Weight loss was 47 g. The product had amine equivalent weight of 270.

Thirteen and one-half (13.5) grams of above was mixed with 5 g of xylene, 3 g of methanol and 12.0 and 14.0 g of EPONEX 1510, respectively. The resultant products were drawn down with 0.003 Bird applicator on BONDERITE ® 1000 and cured at 250° F. for 30 minutes. The resultant cured films passed a 160 inch-pound direct impact test, and a 40 inch-pound reverse impact test, and exhibited a pencil hardness of 3 H. Resin pot life was three hours.

While the illustrative embodiments of the invention have been described hereinabove, it will be understood that various modifications will be apparent to and can be made by those skilled in the art without departing from the scope or spirit of the invention. Accordingly, it is intended that the claims directed to the invention be construed as encompassing all aspects of the invention which would be treated as equivalents by those skilled in the art to which the invention pertains.

What is claimed is:

1. A stable polyamine-functional alkoxysilane resin containing a group of the structure

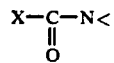

wherein X is a carbon, nitrogen or oxygen atom and wherein the alkoxysilane resin is prepared by reacting at a temperature of from about 25° to 250° C. for about 2 to 3 hours (i) a polycarboxylic acid, a polyisocyanate, an aryl or a low alkyl ester of a polycarboxylic acid having about 1 to 3 carbon atoms in the alkyl group, an aryl or a low alkyl ester of a polycarbamic acid having about 1 to 3 carbon atoms in the alkyl group or a low alkyl ester of a polycarbonic acid having about 1 to 3 carbon atoms in the alkyl group; (ii) a hydroxy- and amine-functional compound selected from the group comprising amino alcohols, amino polyalcohols, polyamine alcohols and polyamino polyalcohols; and (iii) an aminoalkoxysilane compound.

2. The alkoxysilane resin as recited in claim 1 is a polycarboxylic acid or an aryl or low alkyl ester of a polycarboxylic acid having about 1 to 3 carbon atoms in the alkyl group.

3. The alkoxysilane resin of claim 1 wherein the hydroxy- and amine-functional compound is diisopropanolamine, diethanolamine, diisobutanolamine, ethanolamine, isopropanolamine, N-aminoethyl-ethanolamine, aminomethylpropanol or N-aminopropyl-diethanolamine.

4. The alkoxysilane resin of claim 1 wherein the aminoalkoxysilane is of the formula:

$$RNHR^1SiR^2{}_m(OR^3)_n$$

wherein R is hydrogen, an alkyl group with no more than four carbon atoms, an aminoalkyl group, alkylaminoalkyl group, or alkoxysilano alkyl group with no more than 6 carbon atoms; $R^1$ is an alkylene having 2 to 6 carbon atoms, cycloalkylene or aryl group; $R^2$ is an alkyl having 1 to 10 carbon atoms, cycloalkyl or aryl group; m is 0 or 1; $R^3$ is an alkyl group containing 1 to 4 carbon atoms; and n is 3 to 2 and m+n=3.

5. The alkoxysilane resin of claim 4 wherein the aminoalkoxysilane is aminoethyltrimethoxysilane, aminopropyltrimethoxysilane, aminopropyltriethoxysilane, aminopropyldimethoxymethylsilane, aminopropyldiethoxymethylsilane, and aminoethyl-gamma-aminopropyltrimethoxysilane, or iminobis(propyltrimethoxysilane).

* * * * *